United States Patent
Gagnon

(10) Patent No.: US 10,023,094 B2
(45) Date of Patent: Jul. 17, 2018

(54) DEBRIS SHIELD ADAPTABLE FOR USE WITH A VARIETY OF BOATS AND TRAILERS

(71) Applicant: Neil Gagnon, Egan-Sud (CA)

(72) Inventor: Neil Gagnon, Egan-Sud (CA)

( * ) Notice: Subject to any disclaimer, the term of this patent is extended or adjusted under 35 U.S.C. 154(b) by 0 days.

(21) Appl. No.: 15/795,372

(22) Filed: Oct. 27, 2017

(65) Prior Publication Data
US 2018/0118079 A1 May 3, 2018

Related U.S. Application Data

(60) Provisional application No. 62/414,142, filed on Oct. 28, 2016.

(51) Int. Cl.
*B60P 3/10* (2006.01)
(52) U.S. Cl.
CPC .................. *B60P 3/1041* (2013.01)
(58) Field of Classification Search
CPC .......... B60P 3/10; B62D 25/18; B62D 25/00; B62D 25/16; B62D 25/161; B62D 25/163; B62D 25/168
See application file for complete search history.

(56) References Cited

U.S. PATENT DOCUMENTS

| | | | | |
|---|---|---|---|---|
| 4,840,400 A | * | 6/1989 | Greenleaf ................ | B60J 11/06 280/770 |
| 5,058,946 A | * | 10/1991 | Faber .................... | B60P 3/1041 114/361 |
| 5,538,315 A | * | 7/1996 | Dixon .................. | B62D 25/168 296/180.1 |
| 5,558,486 A | * | 9/1996 | Paproski ................. | B60P 1/435 414/483 |
| 6,361,061 B1 | * | 3/2002 | Lea ........................ | B60P 3/1033 280/155 |
| 6,616,188 B1 | | 9/2003 | Jeffries et al. | |

OTHER PUBLICATIONS

Neil Gagnon, Rocshield Manuel D'Installation, Jan. 29, 2014, self published, Egan-Sud, Quebec, Canada.

\* cited by examiner

*Primary Examiner* — John D Walters
*Assistant Examiner* — James J Triggs
(74) *Attorney, Agent, or Firm* — PatentAgency.ca; Luis P. Estable

(57) ABSTRACT

Disclosed herein is a debris shield adaptable for use with a boat and a trailer. The debris shield includes a frame assembly, and a canvas. The frame assembly includes a frame and at least one adjustable arm with one end suitable to be connected to either the side portion of the boat that sits above the trailer or the base of the trailer, and another end suitable to be connected to the frame. The adjustable arm is adjustable in length to adapt the frame to at least one of the height of the boat and the width of the trailer base. The canvas includes a substantially rectangular part. The rectangular part has a trailer side, a stern side, a boat side and a bow side. The trailer side is fastenable to the frame. The debris shield is adjustable to at least one of the height of the boat and the width of the trailer.

20 Claims, 20 Drawing Sheets

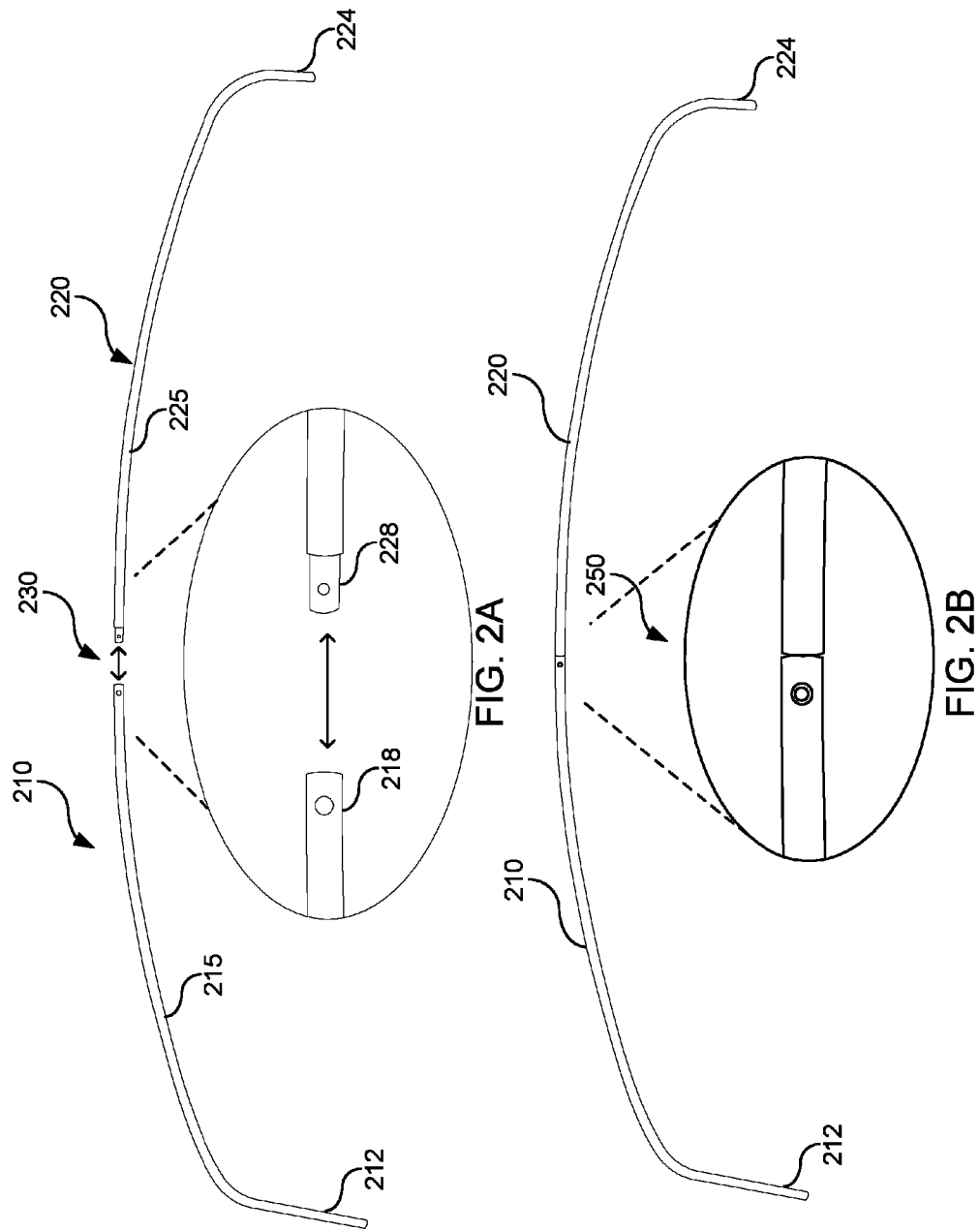

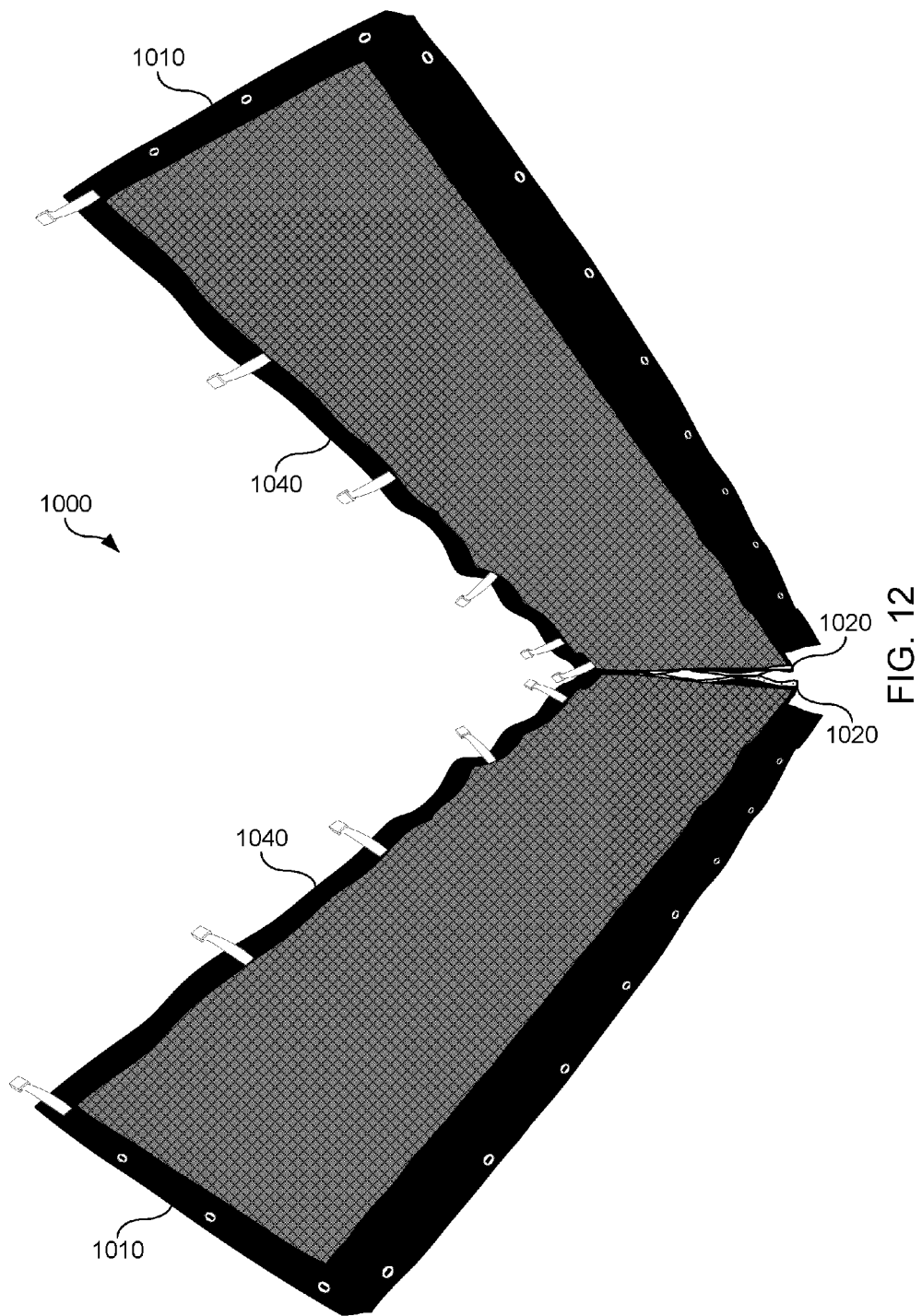

DEBRIS SHIELD ADAPTABLE FOR USE WITH A VARIETY OF BOATS AND TRAILERS

CROSS-REFERENCE TO RELATED APPLICATIONS

The present application is related to U.S. provisional patent application, Ser. No. 62/414,142, filed Oct. 28, 2016, for DEBRIS SHIELD ADAPTABLE FOR USE WITH A VARIETY OF BOATS AND TRAILERS, by Neill Gagnon, included by reference herein and for which benefit of the priority date is hereby claimed.

TECHNICAL FIELD

This application relates to a boat trailer rock shield in general, and to a debris shield adaptable for use with a variety of boats and trailers, in particular.

BACKGROUND OF THE INVENTION

With the high price of boats these days, owners really want to protect their investments, particularly when transporting their boats on roads using a boat trailer hitched to a motor vehicle. Conventionally, when travelling on asphalt roads, it is somewhat rare that these roads have any significant debris, but of course they have some debris here and there. It may only take just one rock on the road to be thrown up to make a dent in your boat. Typically, for someone who never goes into dirt roads, unprotected boats can get a few marks after the first 1-2 years. However, if you go on a dirt road, an unprotected boat may get all dented after just 15 minutes.

A boat is a big investment, so there is always a need for improvements that can protect and mitigate the high cost of repainting, repairing, or replacing a boat or trailer.

Aprons applied directly onto the boat may be used but these may have a significant disadvantage: removing the boats glossy finish. To address this secondary problem, a debris shield that does not actually touch the boat can be used instead in order to eliminate both dents and scuffing marks. Typically a debris shield includes a canvas that is mounted at one to the boat and at the other end to the trailer such that the canvas does not touch the boat to scuff it yet can prevent debris thrown up from the road to reach the boat. To that end, it is known to use a canvas made of mesh, as used in heavy trucks to prevent gravel from spilling out the trailer, to provide the canvas portion of a debris shield.

One disadvantage of both aprons and debris shields is that these products are typically sized to specific boat and or trailer combinations. Furthermore, with some debris shields, it may be required to get on the ground under the boat to operate the assembly.

SUMMARY

According to one aspect of the present application, there is provided a debris shield adaptable for use with a boat and a trailer. The boat has a bow and stern. The trailer has a hitch end and a tail end. The trailer includes a base and wheels. The base has a determinable width along its length, the trailer base being wider at the tail end relative to the narrower hitch end. The wheels are rotationally attached to the base. The trailer is configured to receive the boat for transport whereby the boat sits on the trailer with the bow of the boat oriented towards the hitch end of the trailer and the stern of the boat oriented towards the tail end of the trailer. The boat has portions that sit at a determinable height above the base of the trailer. The debris shield includes a frame assembly, and a canvas. The frame assembly includes a frame having a front portion suitable to be connected to the base of the trailer towards the hitch end of the trailer, a back portion suitable to be connected to the base of the trailer towards the tail end of the trailer, and a substantially straight portion therebetween. The frame assembly includes at least one adjustable arm having one end suitable to be connected to either the side portion of the boat that sits above the trailer or the base of the trailer. Another end of the adjustable arm is suitable to be connected to the frame. The adjustable arm is adjustable in length to adapt the frame to at least one of the height of the boat and the width of the trailer base. The canvas includes a substantially rectangular part. The rectangular part has a trailer side, a stern side, a boat side and a bow side. The trailer side is fastenable to the frame. The stern side is substantially perpendicular to the trailer side and is fastenable to the frame assembly. The boat side is substantially parallel to the trailer side thereby delimiting a height of the rectangular part. The bow side is substantially parallel to the stern side thereby delimiting a length of the rectangular part. The debris shield is therefore adjustable to at least one of the height of the boat and the width of the trailer.

In some embodiments, the debris shield according further includes a second frame assembly and a second substantially rectangular part of the canvas, the second frame assembly and second substantially rectangular part being mirror images of first said frame assembly and first said substantially rectangular part of the canvas. In some embodiments, the two rectangular parts of the canvas are at least partially joined together at their respective bow sides In some embodiments, the partial join at the bow sides is at least partially releasable proximate to the trailer side and includes a cut out portion that is releasably joined using a hook and loop type fastener so as to conform the bow end of the canvas to the hitch end of the trailer. In some embodiments, at least one end of the frame assembly includes an end piece to connect with a corresponding bracket provided at one of the trailer base, the boat, and the frame. In some embodiments, at least one end of the adjustable arm includes an end piece to connect with a frame bracket provided on the frame such that the adjustable arm is free to rotate and be in at least two positions, a stowed position whereat the adjustable arm is substantially parallel to the frame and a deployed position whereat the adjustable arm is substantially perpendicular to the frame. In some embodiments, at least one adjustable arm includes one of a middle adjustable arm and a perpendicular adjustable arm. In some embodiments, the debris shield further includes at least one of a screw, screw knob and turn screw to attach at least one end of the frame and the adjustable arm to one of the trailer base, boat, and frame. In some embodiments, the frame is provided in two parts, a back frame including at least the back portion and a straight end, and a front frame including at least the front portion and a straight end, the back frame and front frame being releasably joined at their respective straight ends to form the substantially straight portion using a joining feature. In some embodiments, the joining feature includes a push button spring snap clip provided on a narrow diameter of the straight end of the back frame and a corresponding pair of holes provided on the straight end of the front frame. In some embodiments, at least one of the stern side and the trailer side of the canvas includes a turnbuckle eyelet to fasten onto a corresponding turnbuckle provided on the frame assembly. In some embodiments, the debris shield further includes at least one strap wherein the boat side of the canvas includes at least one buckle operable with the strap to further conform the boat side of the canvas to the height of the boat. In some embodiments, the at least one strap is adjustable. In some embodiments, the at least one strap includes a T-strap, wherein the bow side of the canvas includes at least one buckle operable with the T-strap and the at least one buckle of the side of the canvas to further conform the bow side of the canvas to the height of the boat. In some embodiments, the T-strap is adjustable. In some embodiments, the frame is bow-shaped, the front portion is a front bent portion, and the back portion is a back bent portion. In some embodiments, the canvas is made of mesh. In some embodiments, at least one portion of the frame is connected to the base of the trailer referencing the trailer, and wherein at least one portion of the frame is connected to the base of the trailer referencing the boat. In some embodiments, the canvas is conformable at least along its boat side to the height of the boat that sits above the trailer. In some embodiments, the canvas includes a portion substantially parallel to the road to further protect from debris that may be thrown up under the trailer and hit the boat.

Other aspects and features of the present invention will become apparent to those ordinarily skilled in the art upon review of the following description of specific embodiments of a debris shield adaptable for use with a variety of boats and trailers, in conjunction with the accompanying drawing figures.

BRIEF DESCRIPTION OF THE DRAWINGS

Embodiments of the present invention will now be described, by way of example only, with reference to the accompanying drawing figures, wherein:

FIG. 2A illustrates an exemplary front frame and an exemplary back frame;

FIG. 2B illustrates the back frame and front frame of FIG. 2A, assembled to from an exemplary bow-shaped frame;

FIG. 12 illustrates the exemplary mesh canvas of FIG. 10, in a deploying position;

DETAILED DESCRIPTION OF THE DRAWINGS

Figure 1:
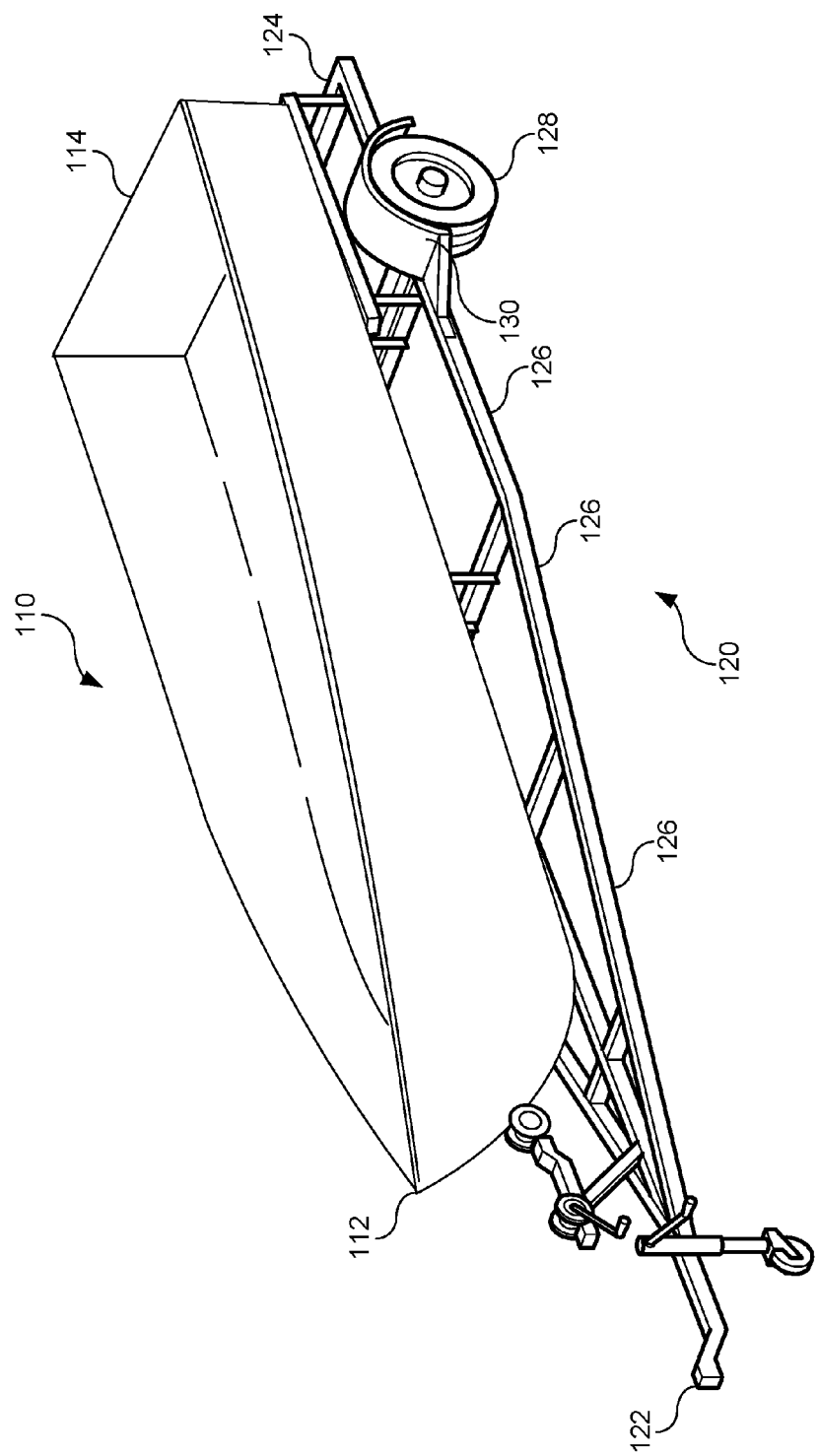
FIG. 1 illustrates an exemplary boat on an exemplary trailer.

Referring to the drawings, FIG. 1 illustrates an exemplary boat on an exemplary trailer. A boat 110 sits on a trailer 120 such that the bow or tip 112 of the boat 110 is oriented towards to the hitch 122 end of the trailer 120, and the stern 114 of the boat is oriented towards the tail end 124 of the trailer. A motor vehicle (not shown) pulls the trailer 120 and the boat 110 thereon by attaching to the hitch 122. The trailer includes a base 126 and wheels 128. The base 116 is typically wider at the tail 124 and narrower at the hitch 122, and the wheels 128, are attached to the base 126 via a rotating axle and suspension (not shown). The wheels 128 may be covered with wheel arches 130.

FIG. 2A illustrates an exemplary front frame and an exemplary back frame. A front frame 210 and a back frame 220 have an elongated bent tubular form with circular cross-section and are made of metal. One end of each of the front frame 210 and back frame 220 includes a substantially bent portion 212, 214 respectively, whereas the other end of the front frame 210 and back frame 220 includes a substantially straight portion 215,225 respectively. The bent portion 212 of the front frame 210 is substantially longer than the bent portion 224 of the back frame 220 such that the front frame 210 is suitable to be connected to the base 126 of the trailer 120 nearer to the hitch 122 and the bent portion 224 of the back frame 220 is suitable to be connected to the base 126 of the trailer 120 nearer to the tail 124. Each of the front frame 210 and the back frame 220 have a corresponding joining feature 218, 228 respectively at their straight portion 215, 225 respectively permitting these parts to be releasably attached to one another to form a generally bow-shaped frame 250 when deployed, or to be more compact when not in use 230. As illustrated the joining feature includes a push button spring snap clip 228 provided on a narrow diameter of the straight end of the back frame 220 and a corresponding pair of holes 218 provided on the straight end of the front frame 210, in a manner similar to what is found in a tent pole.

FIG. 2B illustrates the back frame and front frame of FIG. 2A, assembled to from an exemplary bow-shaped frame. The bent portion 212 of the front 210 of the frame 250 is substantially longer than the bent portion 224 of the back 220 of the frame 250 such that the front 210 of the frame 250 is suitable to be connected to the base 126 of the trailer 120 nearer to the hitch 122 and the bent portion 224 of the back 220 of the frame 250 is suitable to be connected to the base 126 of the trailer 120 nearer to the tail 124. Although what has been illustrated is a preferred embodiment, in alternative embodiments, the frame 250 can be provided using a single element instead of a front frame and a back frame, or more than two elements. Furthermore, in alternative embodiments, the cross-section need not be circular, and the frame may be shaped other than a bow, so long as it is possible to connect the frame to the base of a trailer near the hitch and near the tail ends.

Figure 3A:
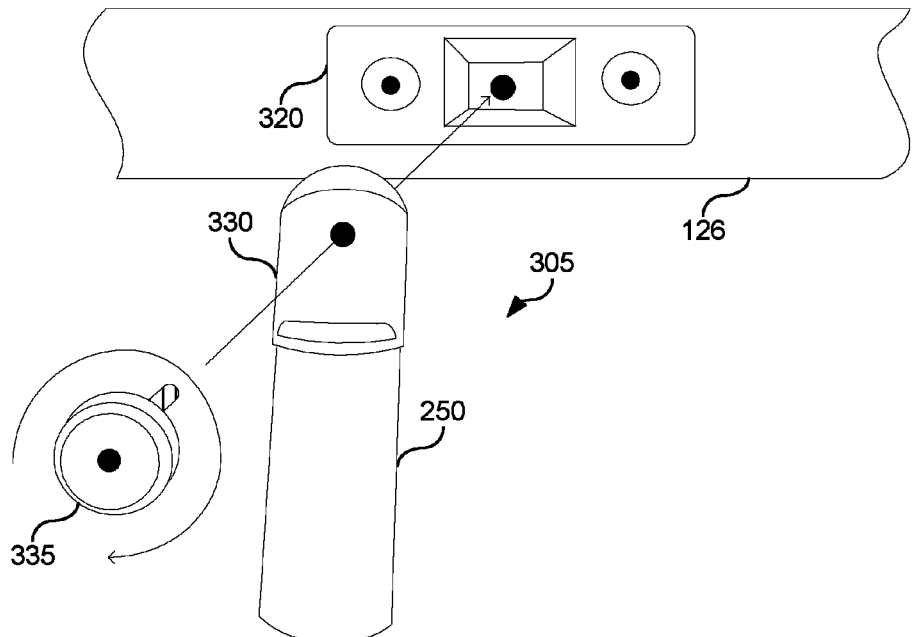
FIG. 3A illustrates an exemplary mechanism to connect the exemplary frame of FIG. 2B to the base of the exemplary trailer of FIG. 1.
Figure 3B:
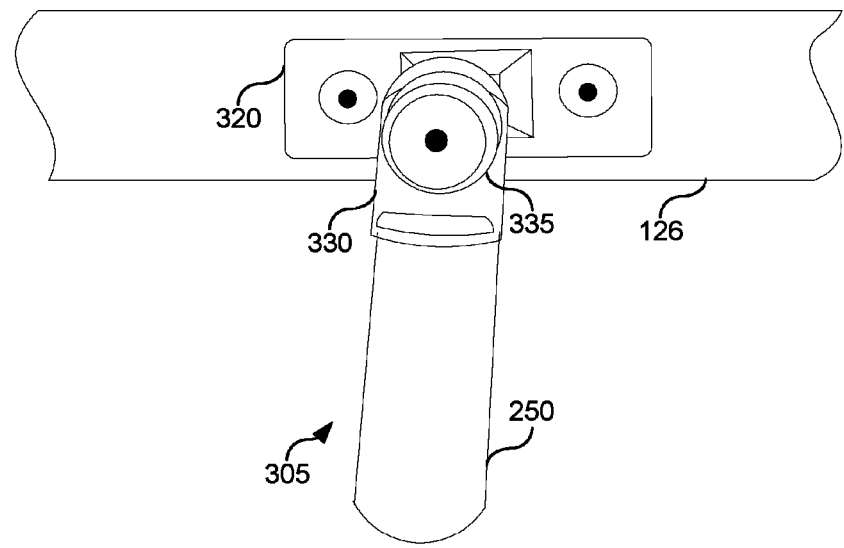
FIG. 3B illustrates the exemplary mechanism of FIG. 3A in an assembled configuration.

FIG. 3A illustrates an exemplary mechanism to connect the exemplary frame of FIG. 2B to the base of the exemplary trailer of FIG. 1. FIG. 3B illustrates the exemplary mechanism of FIG. 3A in an assembled configuration. As shown in FIG. 3A, a trailer bracket 320 is attached to the base 126 of the trailer 120 so as to releasably connect an end 305 of the frame 250 to the trailer 120 using an end piece 330 and a screw knob 335. The end 305 of the frame 250 shown could be the end of the bent portions 214, 224 respectively of the front 210 and back 220 of the frame 250. Operationally, one would pre-drill and install a set of trailer brackets 320 symmetrically underneath both sides of the trailer 120 at the base 126 referencing the back wheel 128 of the trailer 120. The mechanism and operations shown are also used to pre-drill and install a set of boat brackets 310 symmetrically on both sides of the boat 110 referencing the stern 114 of the boat, and to pre-drill and install a set of hitch brackets 340 underneath the hitch end 112 of the trailer 120.

Figure 4A:
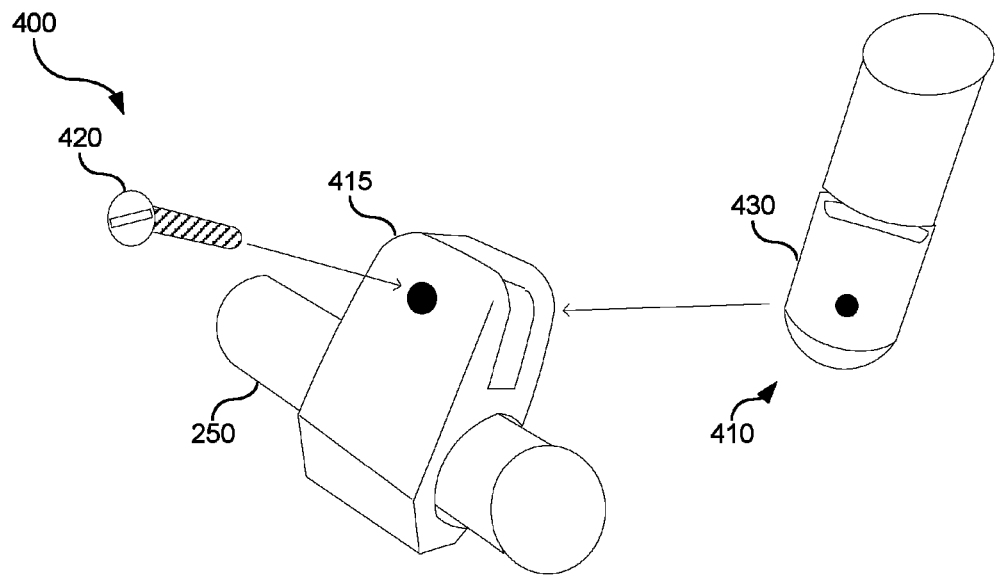
FIG. 4A illustrates an exemplary mechanism to connect the exemplary end piece of FIG. 3 to the exemplary frame of FIG. 2.
Figure 4B:
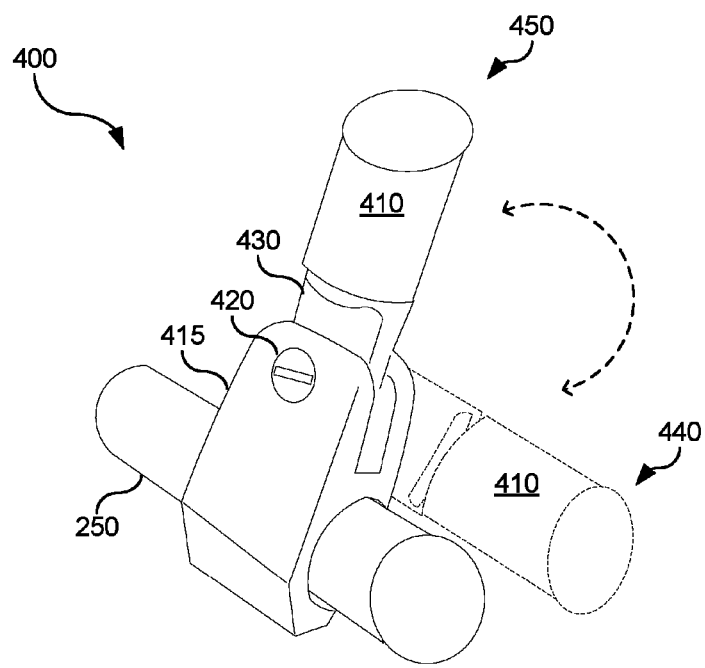
FIG. 4B illustrates the exemplary mechanism of FIG. 4A in an assembled configuration.

FIG. 4A illustrates an exemplary mechanism to connect the exemplary end piece of FIG. 3 to the exemplary frame of FIG. 2. FIG. 4B illustrates the exemplary mechanism of FIG. 4A in an assembled configuration. As shown in FIG. 4A, an end 410 of a middle arm is fitted with an end piece 430 that can be slid into a frame bracket 415 provided on the frame 250. A screw 420 secures the end piece 430 to the frame bracket such that, as shown in FIG. 4B, the middle arm is free to rotate and be in at least two positions: a stowed position substantially parallel 440 to the frame 250 and a deployed position substantially perpendicular 450 to the frame 250. The same mechanism 400 and operations shown are also used to connect the exemplary frame of FIG. 2B to an end 410 of a perpendicular arm.

Figure 5A:
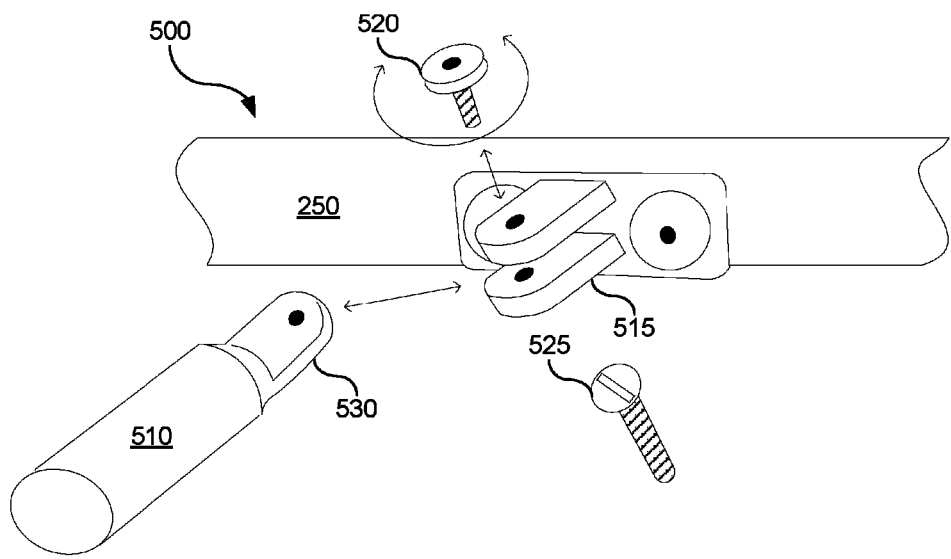
FIG. 5A illustrates an exemplary mechanism to connect the exemplary frame of FIG. 2B to the base of the exemplary trailer of FIG. 1.
Figure 5B:
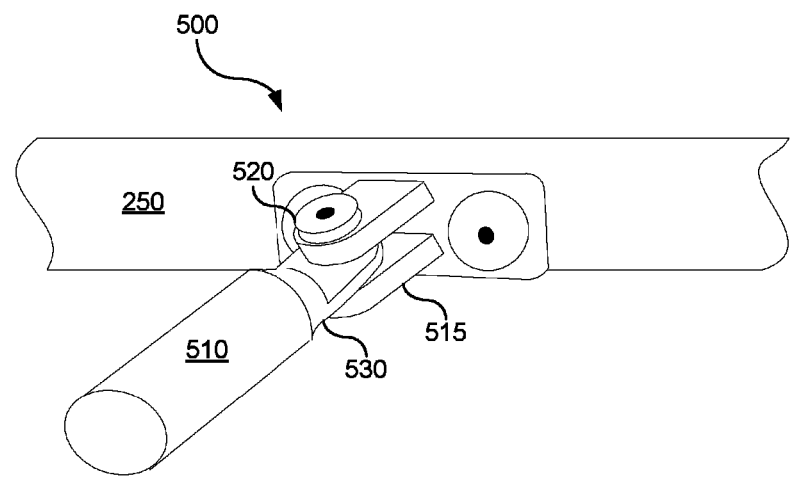
FIG. 5B illustrates the exemplary mechanism of FIG. 5A in an assembled configuration.

FIG. 5A illustrates an exemplary mechanism to connect the exemplary frame of FIG. 2B to the base of the exemplary trailer of FIG. 1. FIG. 5B illustrates the exemplary mechanism of FIG. 5A in an assembled configuration. As shown in FIG. 5A, an end 510 of a middle arm is fitted with an end piece 530 that can be slid into a middle bracket 515 provided on the frame 250. A turn screw 520 releasably connects the end piece 530 to the base 126 of the trailer 120 via the middle bracket 510. Compared to the mechanism of FIG. 3, the mechanism 500 of FIG. 5 operates at a different angle. In some embodiments, a regular screw 525 is used instead of the turn screw 520.

Figure 6:
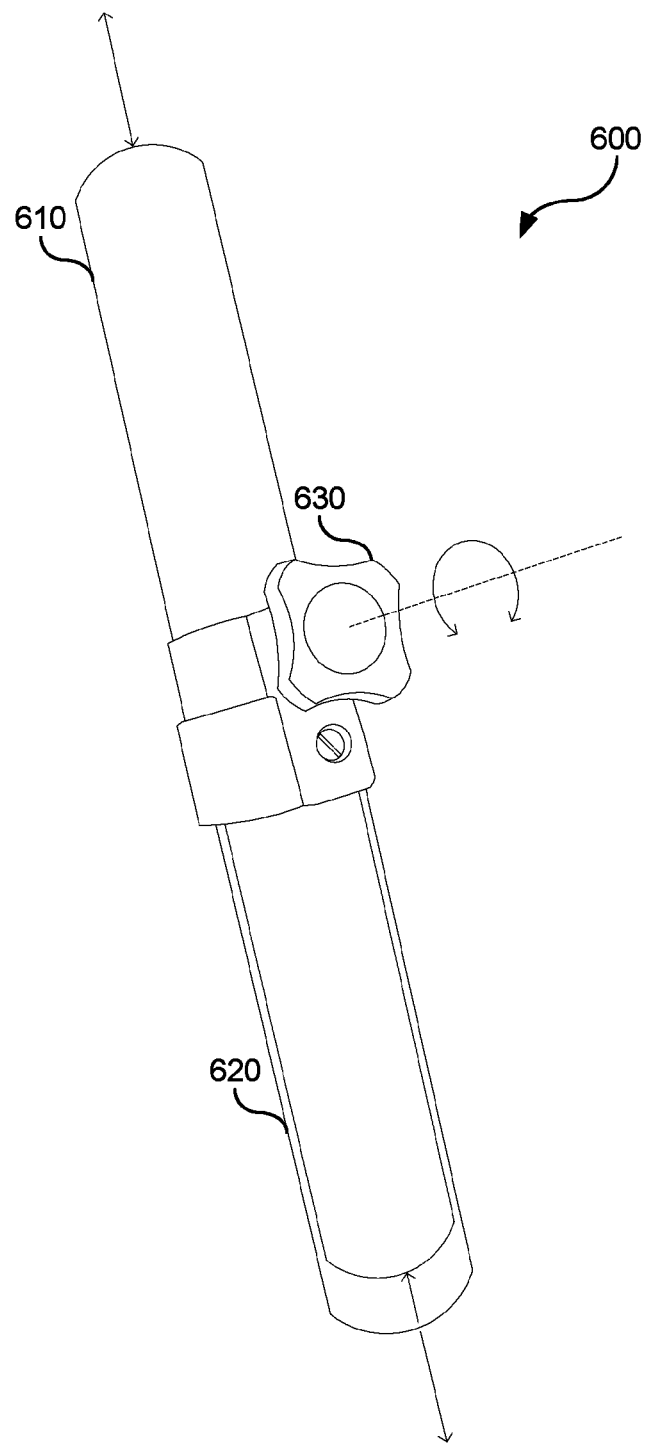
FIG. 6 illustrates an exemplary mechanism to adapt the length of an exemplary middle arm or exemplary perpendicular arm.

FIG. 6 illustrates an exemplary mechanism to adapt the length of an exemplary middle arm or exemplary perpendicular arm. As shown in FIG. 6, a first top portion 610 of the mechanism 600 is telescoped into the second portion 620 of the mechanism 600. A hand operated knob 630 is provided to increase or decrease the friction between the two portions, thereby allowing one to lengthen or shorten the mechanism as needed.

Figure 7:
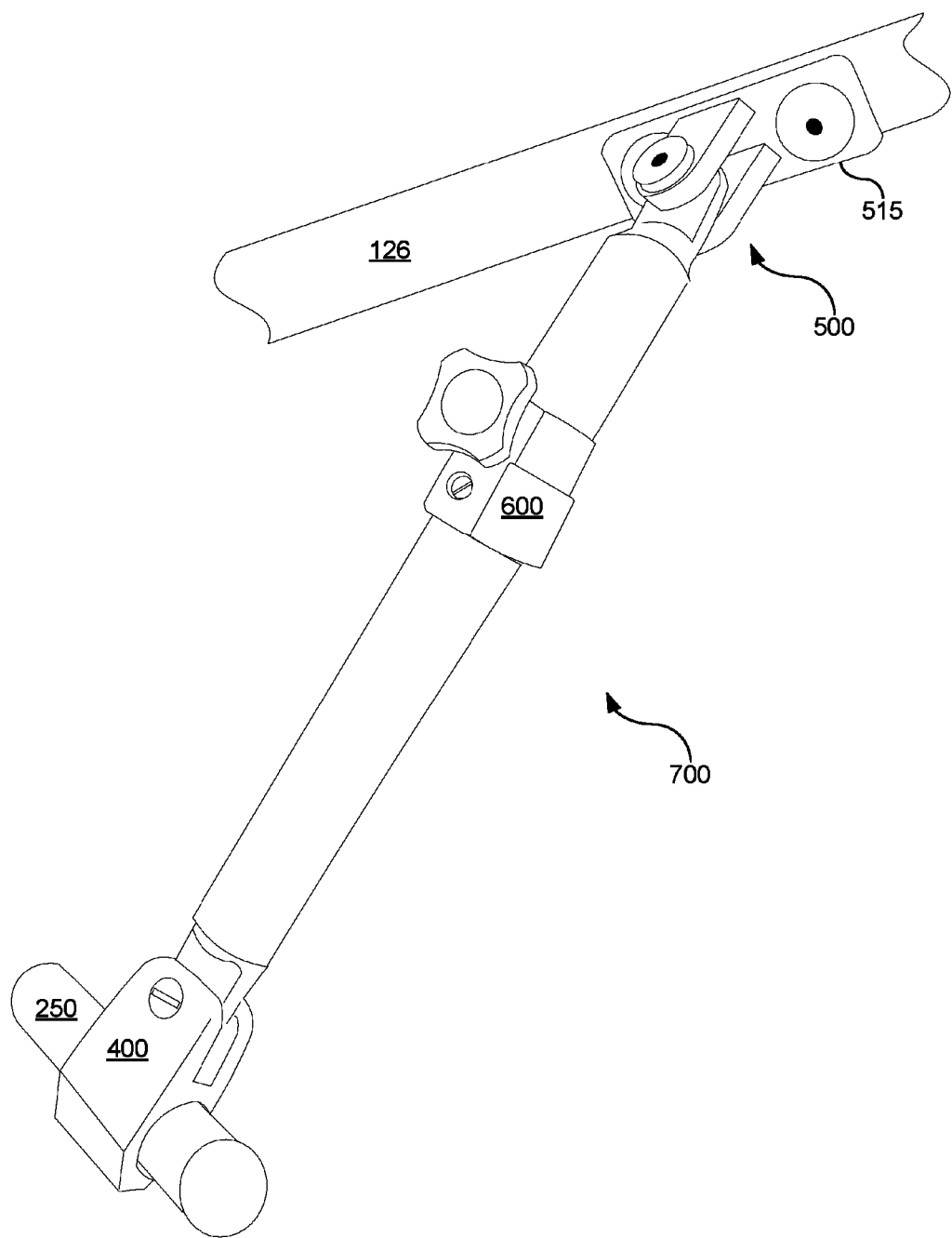
FIG. 7 illustrates an exemplary middle arm releasably connected to a trailer at one end, and connected to an exemplary frame on the other end.

FIG. 7 illustrates an exemplary middle arm releasably connected to a trailer at one end, and connected to an exemplary frame on the other end. As shown in FIG. 7, the mechanism 400 of FIG. 4 is used to connect the frame 250 to a first end of the exemplary middle arm 700, and the mechanism 500 of FIG. 5 is used to connect the middle arm 700 to the base 126 of the trailer 120. The length of the middle arm 700 can be adjusted by use of the mechanism 600 of FIG. 6. Operationally, once one would have screwed and secured a pair of back frames 220 to the trailer brackets 320, and screwed and secured a pair of front frames 210 to the hitch brackets 340. Once the front and back of the frame 250 are attached, one would pre-drill and install a middle bracket 510 on the side of the trailer 120 onto the base 126 where it aligns. Then one would deploy and adjust the length of the middle arm 700, and screw and secure the middle arm 700 to the middle bracket 510. This mechanism ensures that the frame is adaptable to a variety of trailers.

Figure 8:
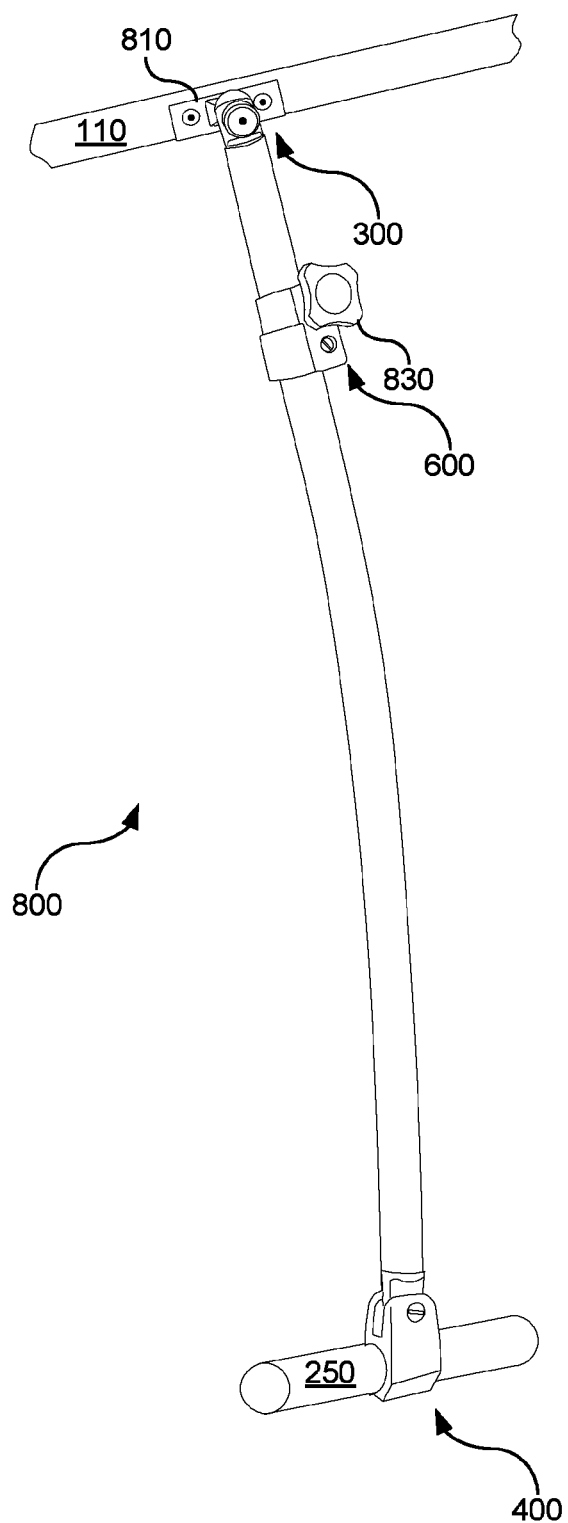
FIG. 8 illustrates an exemplary perpendicular arm connected to a boat at one end, and connected to an exemplary frame on the other end.

FIG. 8 illustrates an exemplary perpendicular arm connected to a boat at one end, and connected to an exemplary frame on the other end. As shown in FIG. 8, the mechanism 400 of FIG. 4 is used to connect the frame 250 to a first end of the exemplary perpendicular arm 800, and the mechanism 300 of FIG. 3 is used to connect the perpendicular arm 800 to the boat 110. The length of the perpendicular arm 800 can be adjusted by use of the mechanism 600 of FIG. 6. Operationally, one would deploy and secure the perpendicular arm 800 to the boat bracket 810, releasing the knob 830 for adjusting the telescoping action to the proper length, tightening the knob 830, and securing to the boat brackets. This mechanism ensures that the frame is adaptable to a variety of boats using a boat bracket 810.

Figure 9:
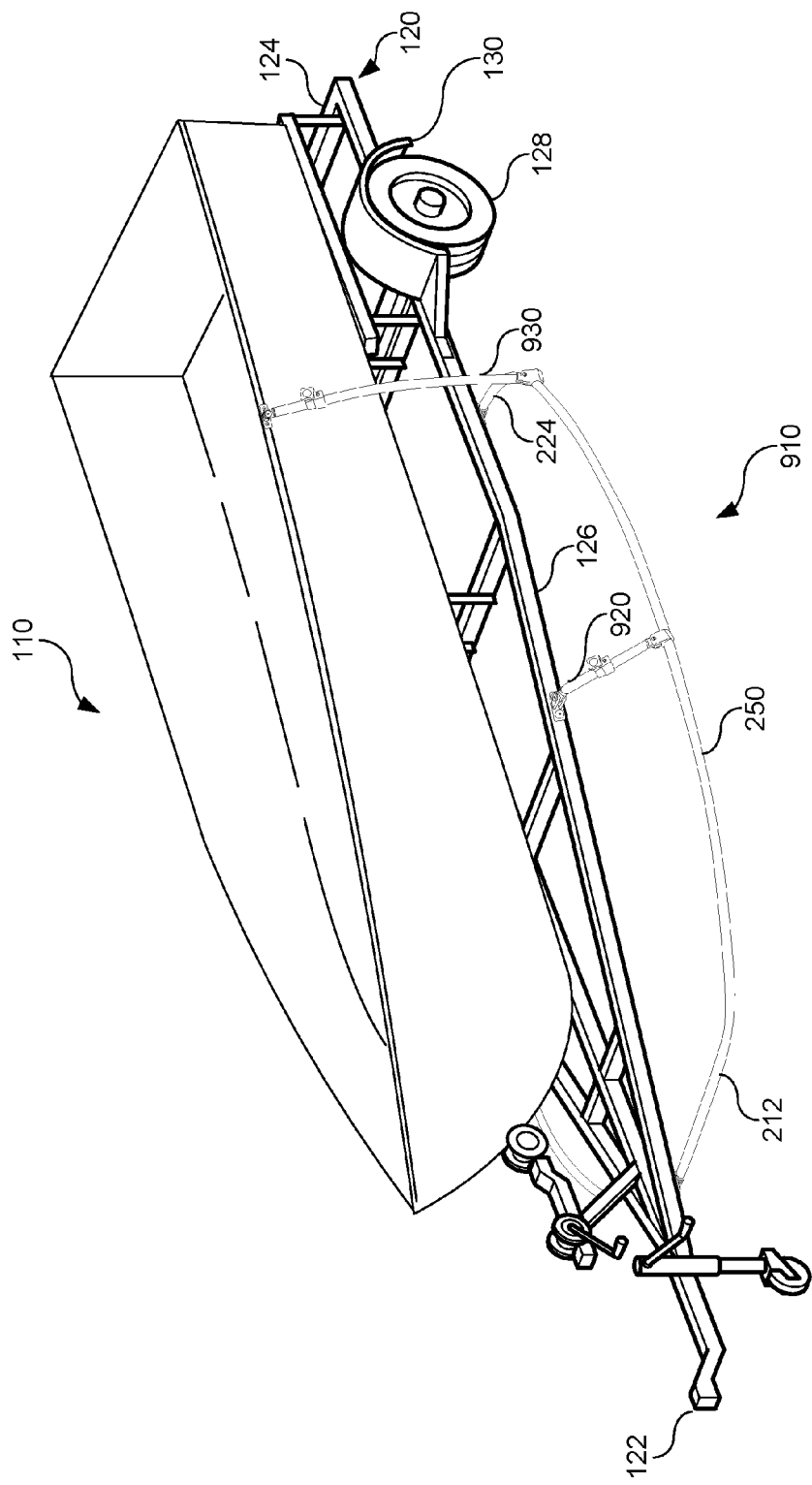
FIG. 9 illustrates an exemplary frame assembly connected to a trailer and a boat.

FIG. 9 illustrates an exemplary frame assembly connected to a trailer and a boat. As shown in FIG. 9, the mechanisms of FIGS. 1-8 are combined to provide the frame assembly 910, that includes a bow-shaped frame 250 connected at a first substantially bent end 212 towards the hitch end of the trailer base and connected at a second substantially bent end 224 towards the tail end 124 of the trailer base 126, a middle arm 920 connecting a substantially straight portion 210,220 of the bow shaped frame 250 to the middle of the trailer base 126, and a perpendicular arm 930 connecting the second substantially bent portion 224 of the bow shaped frame to the boat 110. Advantageously, in a preferred embodiment, the frame assembly is dimensioned so that the rear end of the frame 250 is substantially flush with the outside of the wheels 128 or wheel arches 130 of the trailer 120.

Figure 10:
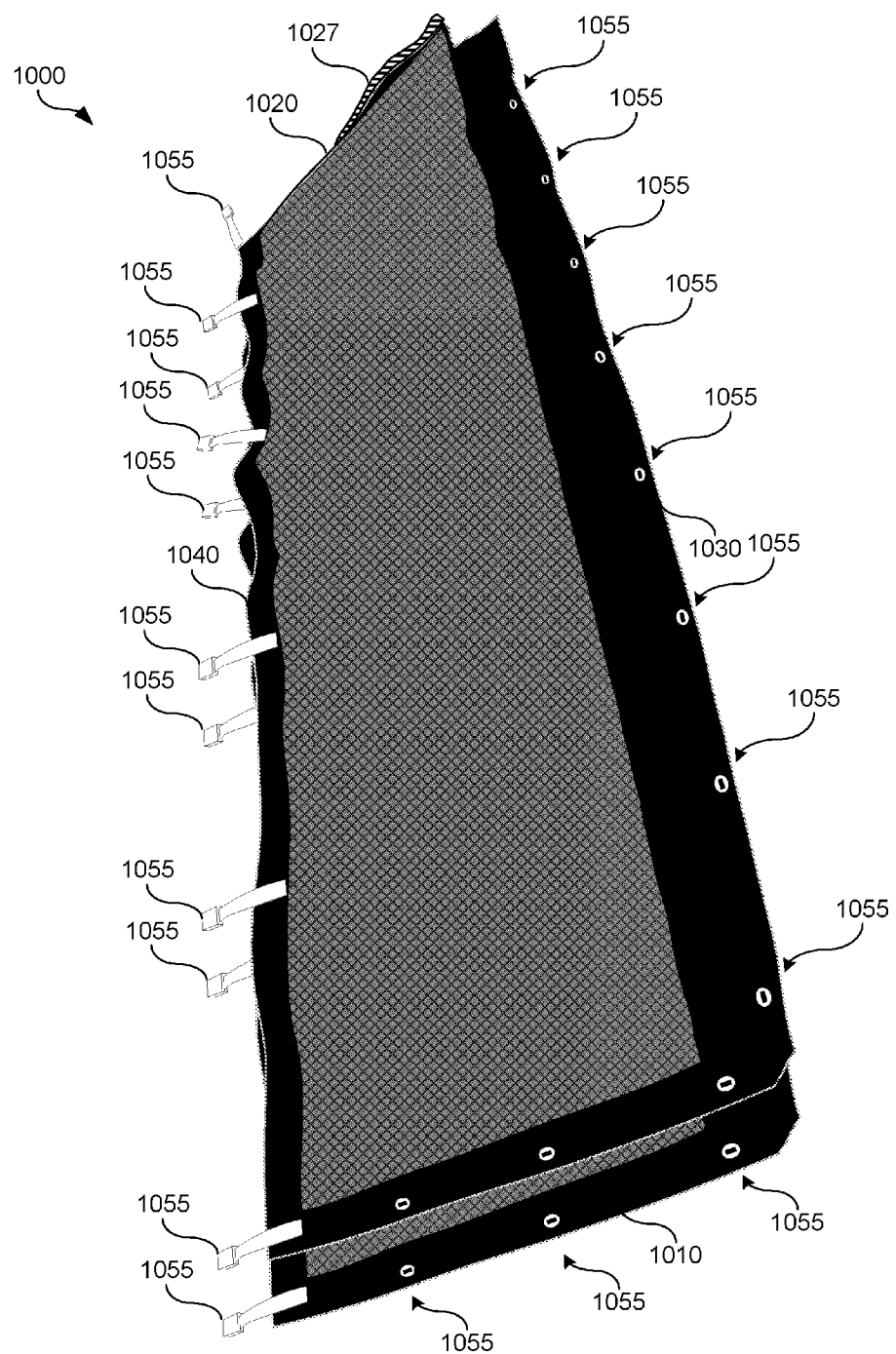
FIG. 10 illustrates an exemplary mesh canvas, in a folded position.

FIG. 10 illustrates an exemplary mesh canvas, in a folded position. As shown in FIG. 10, the mesh canvas includes two substantially rectangular parts that are partially releasably joined together at one end. Each part extends from a stern side 1010 to a bow side 1020 and from a trailer side 1030 to a boat side 1040. As shown in the drawing, mechanisms 1050 to fasten the mesh canvas to the frame assembly 910, and to fasten each part of the mesh canvas 1000 to the other part of the mesh canvas 1000, are provided. Although turnbuckle eyelets 1055 are shown and preferred in this example to releasably fasten the mesh canvas to the frame assembly, other fastening mechanisms are envisaged. Although straps and buckles 1057 are shown and preferred in the drawing, mechanisms to releasably fasten each part of the mesh canvas to the other part are also envisaged. The bow ends 1020 of each of the parts of the mesh canvas are joined together, and there is a cut-out section below 1025 the joined part that can be releasably joined in order to conform the bow ends of each part to the hitch end of a variety of trailers. Although Velcro® 1027 is shown in the drawing, a form of hook and loop fastener, other mechanisms to releasably join the bow ends together are envisaged. In an alternative embodiment, the bow ends 1025 are provided in entirely separate parts that can be joined together throughout their entire length. Of particular importance is the inclusion of at least one strap and buckle 1060 substantially at the upper bow end of the mesh canvas. Although only one fold is shown, the mesh canvas can be folded over onto itself so that it takes up very little space when stowed.

Figure 11A:
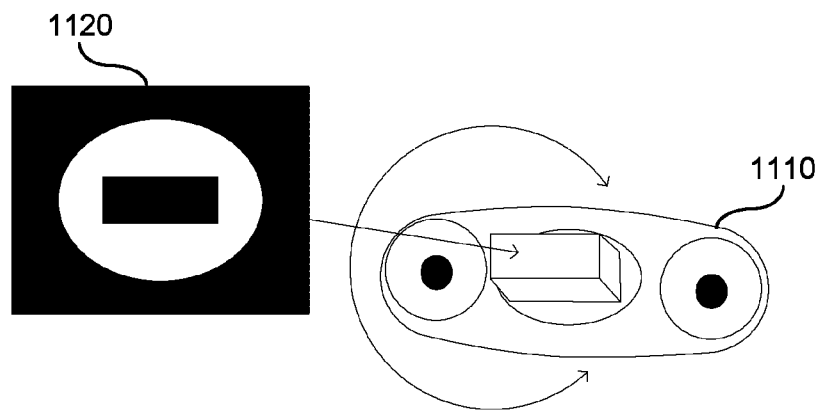
FIG. 11A illustrates an exemplary eyelet and turnbuckle mechanism.
Figure 11B:
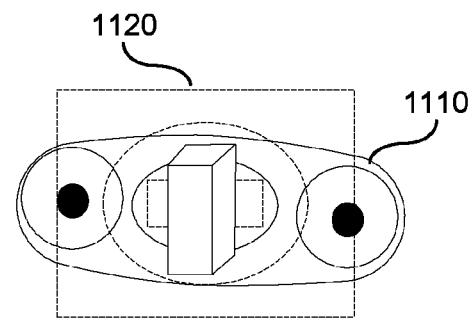
FIG. 11B illustrates the exemplary mechanism of FIG. 11A in an assembled configuration.

FIG. 11A illustrates an exemplary eyelet and turnbuckle mechanism FIG. 11B illustrates the exemplary mechanism of FIG. 11A in an assembled configuration. As shown in FIG. 11A, a turnbuckle 1110 can be used to releasably attach the mesh canvas to the frame assembly. Each turnbuckle 1110 can be riveted to the frame assembly to coincide with a corresponding eyelet 1120 of the mesh canvas. Inserting then turning the turnbuckle in an eyelet of the mesh canvas releasably attaches the mesh canvas. FIG. 11B shows the turnbuckle in an attached position. Detaching is the reverse operation as attaching.

FIG. 12 illustrates the exemplary mesh canvas of FIG. 10, in a deploying position. As shown in FIG. 12, in a deploying position the mesh canvas 1000 takes on a substantially V-shape that is well suited to fit onto the bow of a boat. Operationally, to begin installation of the mesh canvas one would place adjustable straps inside boat. Unfold and install the mesh canvas beginning from the middle on the tip of the bow of the boat.

Figure 13:
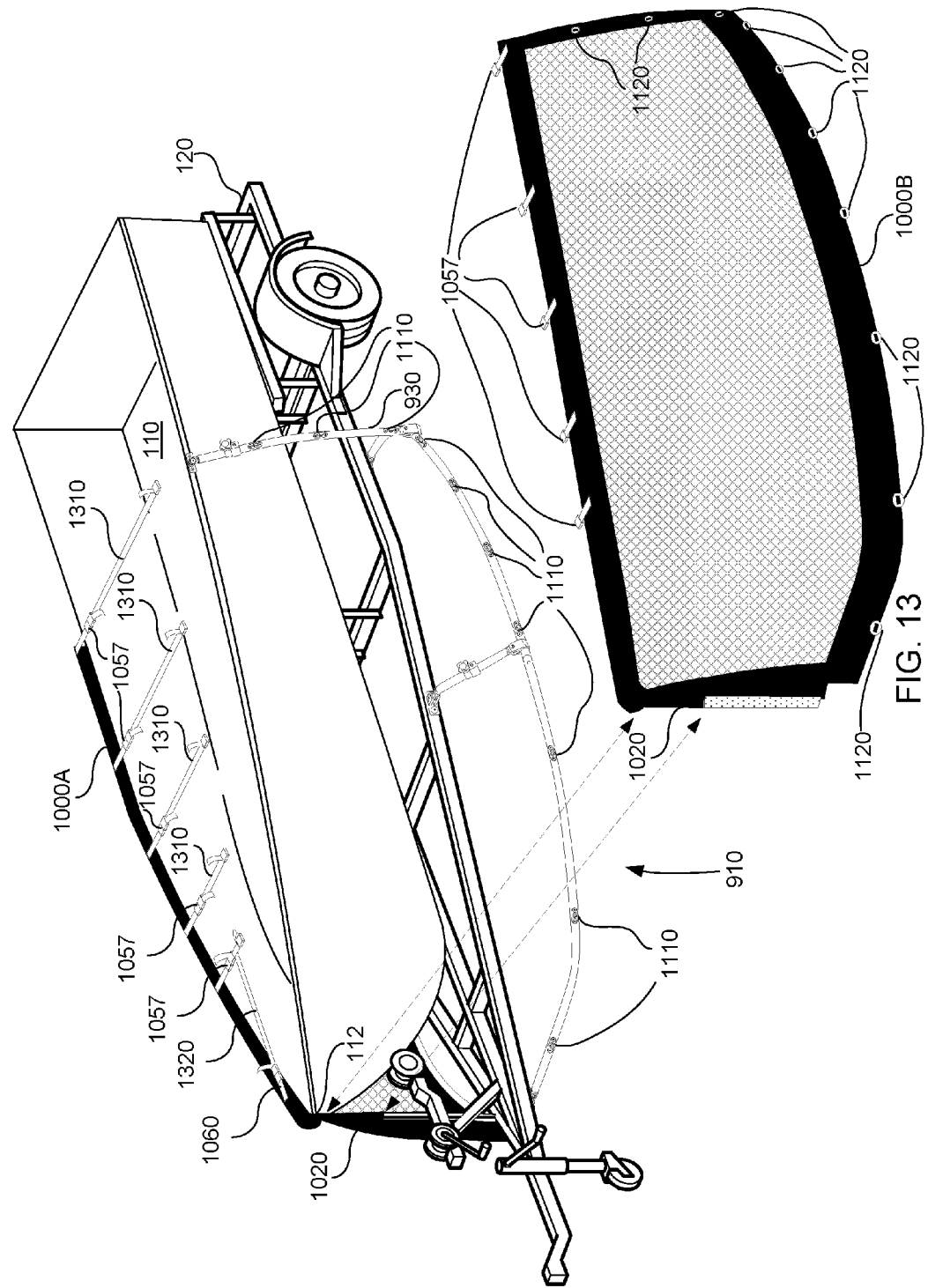
FIG. 13 illustrates the attachment of the mesh canvas of FIG. 10 onto the boat, trailer, and frame assembly of FIG. 9.

FIG. 13 illustrates the attachment of the mesh canvas of FIG. 10 onto the boat, trailer, and frame assembly of FIG. 9. As shown in FIG. 13, the mesh canvas 1000 has been shown in an exploded view whereat the two rectangular parts 1000A, 1000B of the mesh canvas 1000 are shown separately for clarity. In a preferred embodiment, the two parts are joined at the upper bow end 1020 to facilitate installation at the bow 112. Operationally, deploy and secure the mesh canvas 1000 to the perpendicular arms 930 using first the topmost turnbuckle 1110 on each perpendicular arm 930 bracket by inserting then turning the turnbuckle 1110 in the topmost eyelet 1120 of the mesh canvas on each side. Once both sides of the boat 110 are secured, connect the adjustable straps 1310 placed inside the boat 110 to the straps and buckles 1057 on the mesh canvas 1000. Adjust straps 1310 to remove any slack in the canvas 1000, most notably in the rear straps near the perpendicular arm frames 930, and the bottom portion of a T-strap 1320 near the tip of the bow 112 of the boat 110, as well as all the side straps in between such that the turnbuckle eyelets 1120 at the back and bottom of the mesh align with the turnbuckles 1110 in the perpendicular arm 930 bracket, the back and front frame respectively. The T-strap 1320 is unique in that it connects three straps and buckles on the canvas mesh 1000: the bow end strap and buckle 1060, and each of the first straps and buckles 1057 on either part of the mesh canvas. Attach rear and bottom of the canvas to perpendicular, back, and front frame inserting turnbuckles into corresponding eyelets, and turning turnbuckle. Removal is the same operation in reverse.

Figure 14:
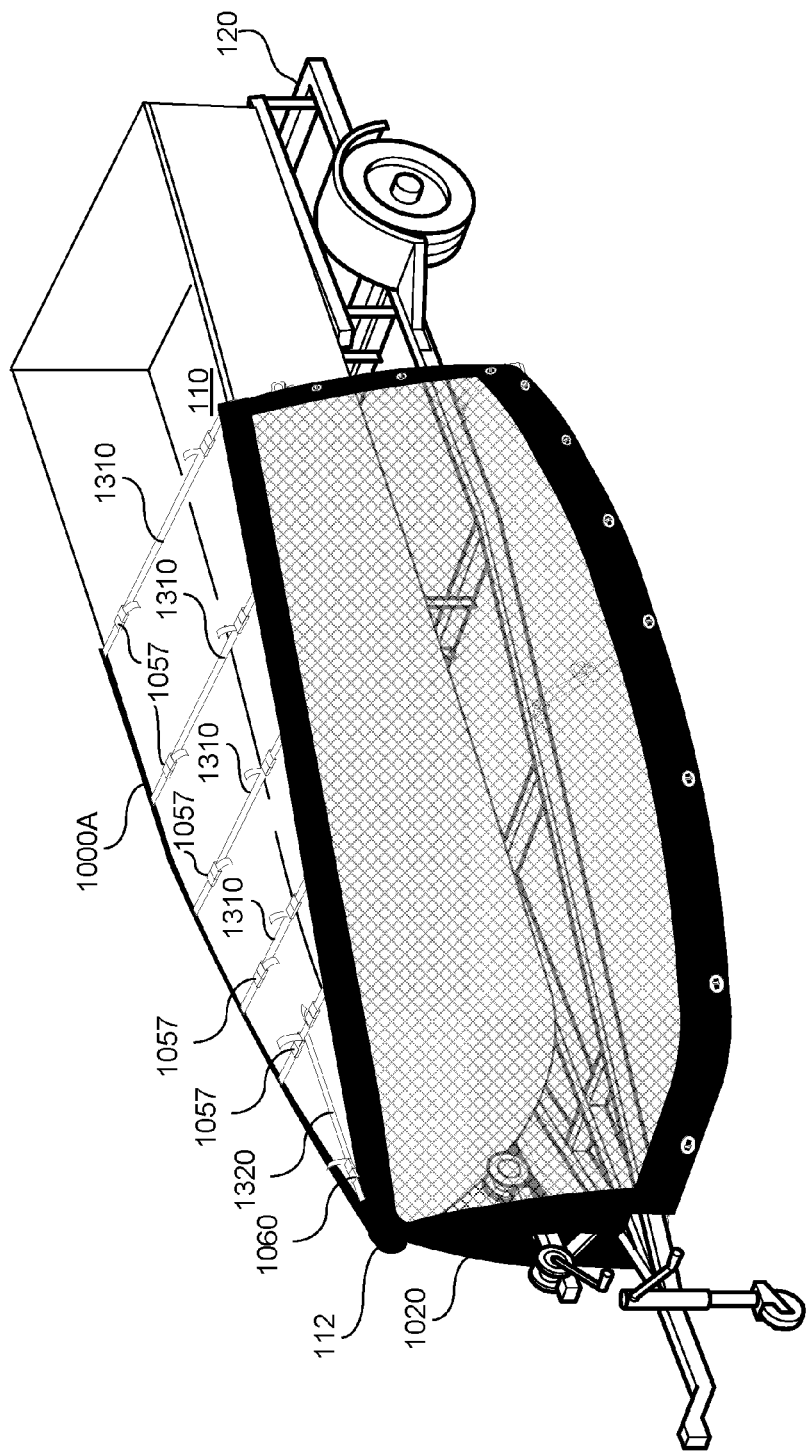
FIG. 14 illustrates the mesh canvas of FIG. 10 attached onto the boat, trailer and frame assembly of FIG. 9.

FIG. 14 illustrates the mesh canvas of FIG. 10 attached onto the boat, trailer and frame assembly of FIG. 9. As shown in the drawings by working back from FIG. 14, advantageously, the entire system can be folded and disassembled to be stowed or shipped in a box, by unscrewing the perpendicular arm, the middle arm, the front and back frames, detaching the front and back frames, folding down the middle arm and perpendicular arm. There are only six holes to drill on each side of the trailer, some rivets to install and a few measurements to take down, and two holes on each side of the boat. The approximate installation time is one hour. It only takes a few minutes to put on and take off. The system includes finger operated turnbuckles, straps are installed above or under the boat cover. You only have to bend down to operate the turnbuckles to attach or release the mesh canvas. The canvas itself is made of mesh and is very light, only about 5-6 lbs. Extremely durable, the system can be on the road for many years.

Figure 15:
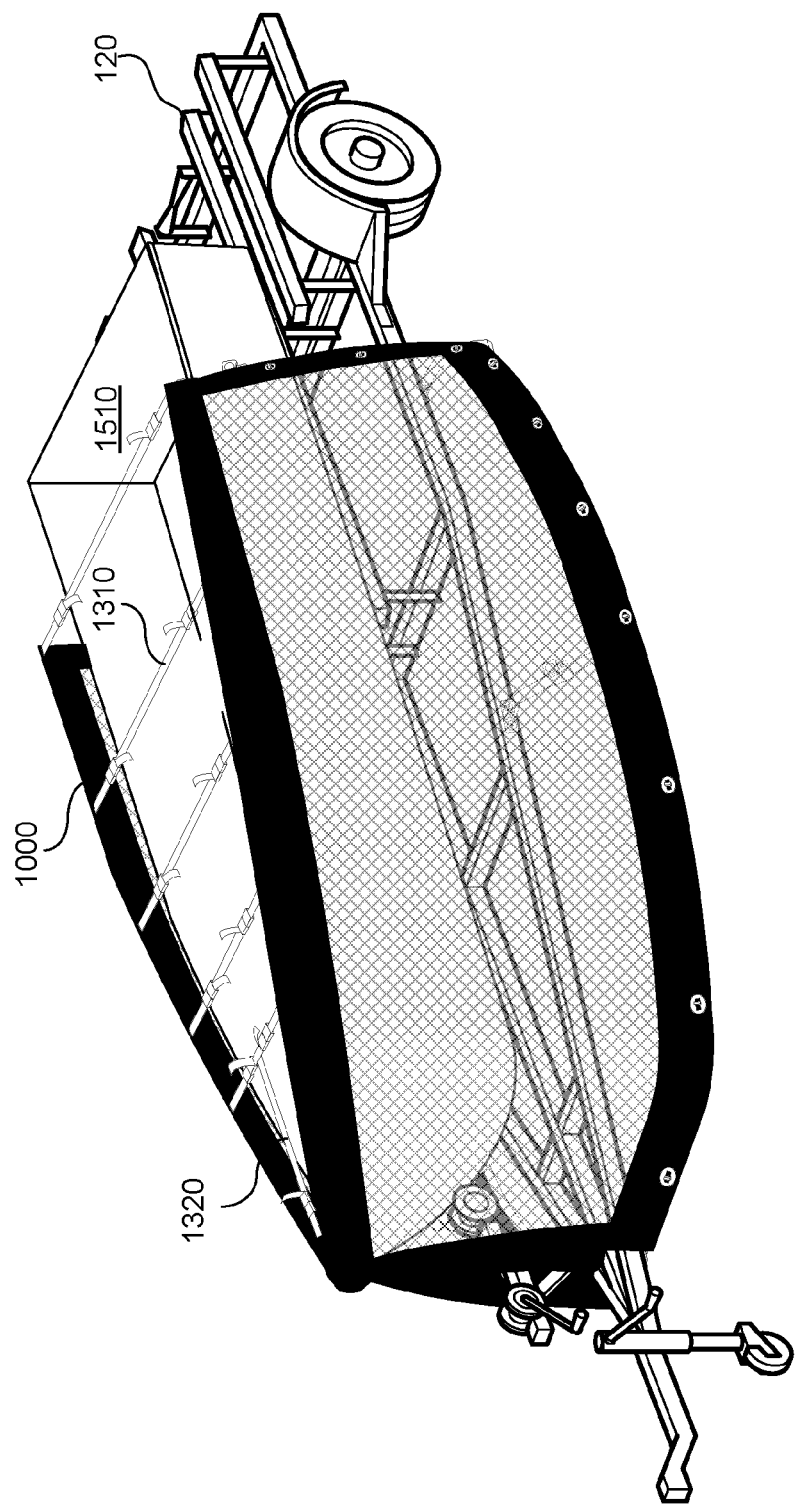
FIG. 15 illustrates the mesh canvas of FIG. 10 attached onto a smaller boat, and the trailer and frame assembly of FIG. 9, in an unadjusted configuration.
Figure 16:
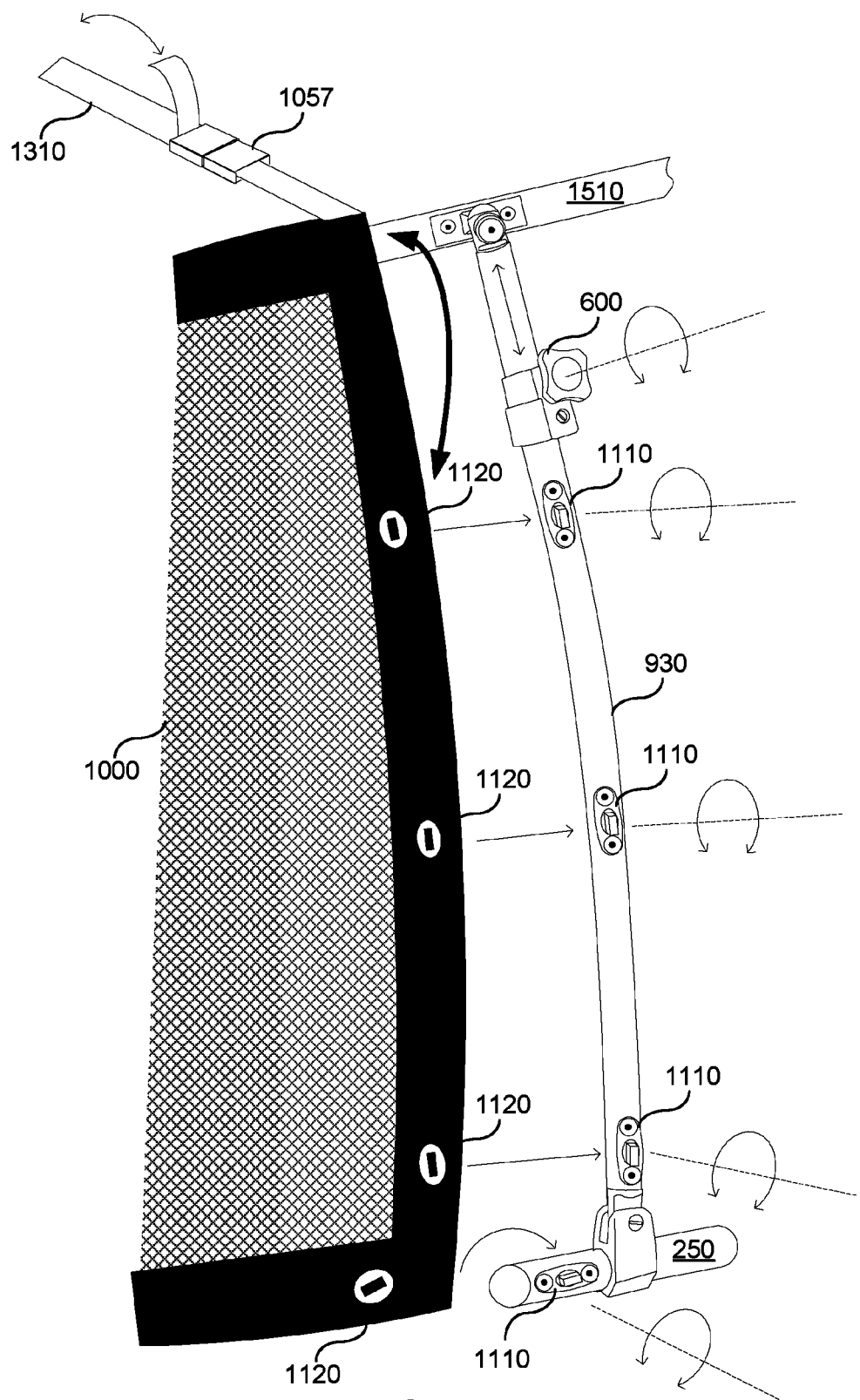
FIG. 16 illustrates the adaptability of the mesh canvas and perpendicular arm of frame assembly.
Figure 17:
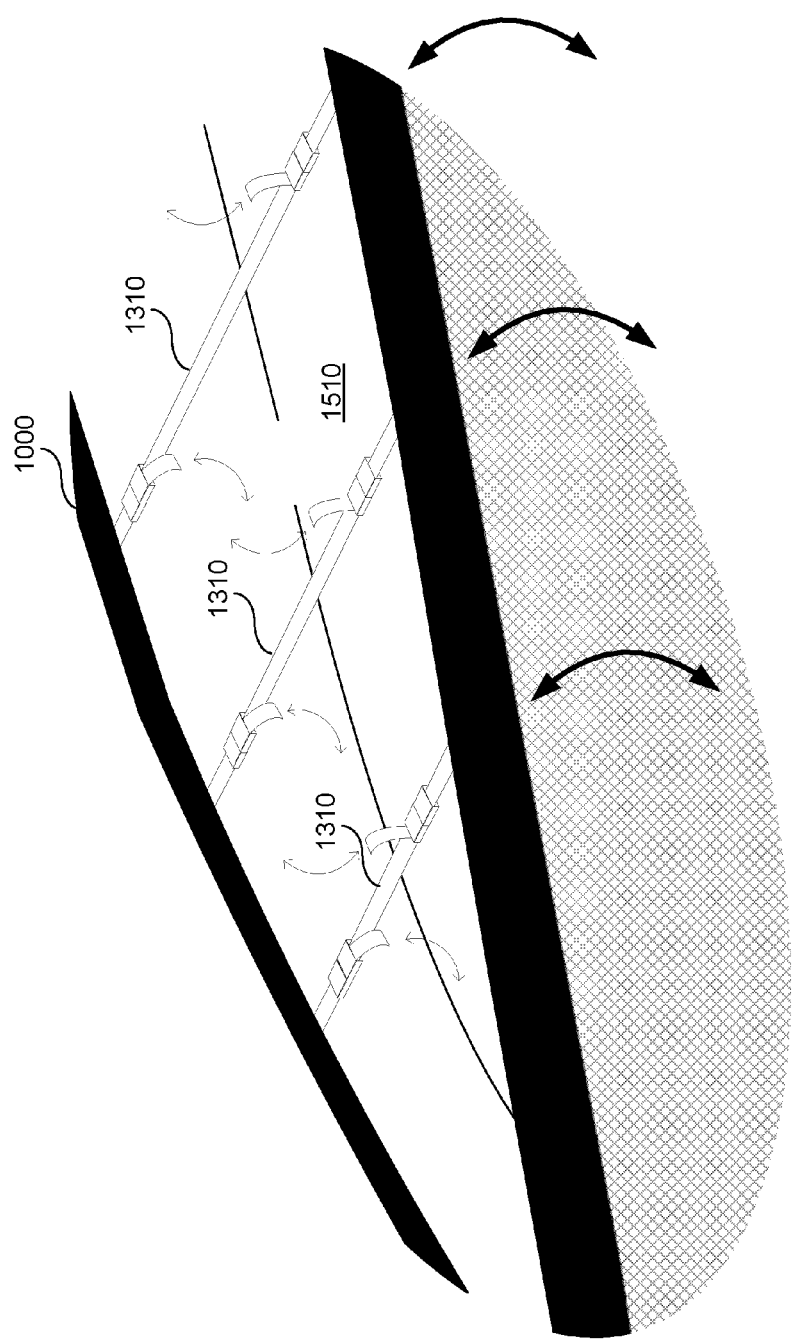
FIG. 17 illustrates the adjustable straps in the centre portion of the mesh canvas.
Figure 18:
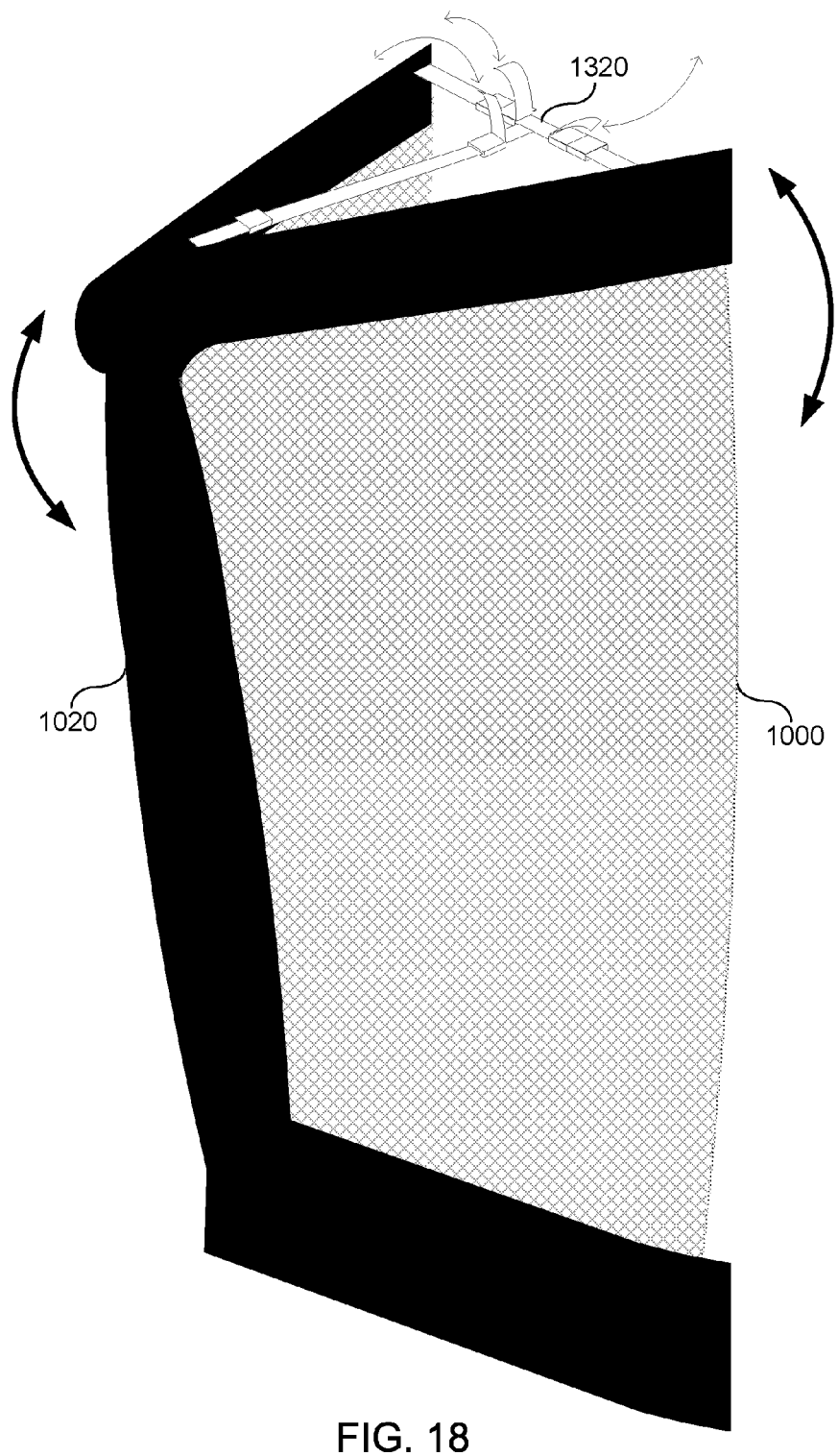
FIG. 18 illustrates the adjustable T-strap in the bow end of the mesh canvas.

FIG. 15 illustrates the mesh canvas of FIG. 10 attached onto a smaller boat, and the trailer and frame assembly of FIG. 9, in an unadjusted configuration. As shown in the drawing, when a smaller boat 1510 is placed on the same trailer 120, the same mesh 1000, straps 1310, 1320 and frame assembly (hidden by the mesh 1000) at first may appear to be improperly sized for the smaller boat 1510. FIGS. 16, 17 and 18 illustrate the operations to adapt the mesh canvas and frame assembly to the smaller boat 1510.

FIG. 16 illustrates the adaptability of the mesh canvas and perpendicular arm of frame assembly. As shown in the drawing, to adjust the length of the perpendicular arm 930 to adapt the frame assembly to a variety of boats, one would operate the mechanism of FIG. 6. In the case of the smaller boat 1510 of FIG. 15, the mechanism 600 is used to shorten the length of the perpendicular arm 930. To adjust the height of the mesh canvas 1000, one would operate the adjustable straps 1310, 1320 that connect each stern end of the mesh canvas to each other in order to lengthen or shorten them. In the case of the smaller boat of FIG. 15, the straps 1310, 1320 would be shortened. Also shown in the drawing is the attaching and detaching operation of the turnbuckles 1110 and eyelets 1120.

FIG. 17 illustrates the adjustable straps in the centre portion of the mesh canvas. As shown in the drawing, to adjust the height of the mesh canvas 1000, one would operate the adjustable straps 1310 that connect each middle portion of the mesh canvas to each other in order to lengthen or shorten them. In the case of the smaller boat 1510 of FIG. 15, the straps 1310 would be shortened.

FIG. 18 illustrates the adjustable T-strap in the bow end of the mesh canvas. As shown in the drawing, to adjust the height of the mesh canvas at the bow 1010 end, one would operate the adjustable T-strap 1320 that connects each bow portion of the rectangular mesh canvas 1000 parts to each other in order to lengthen or shorten them. In the case of the smaller boat 1510 of FIG. 15, the T-strap 1320 would be shortened.

Figure 19:
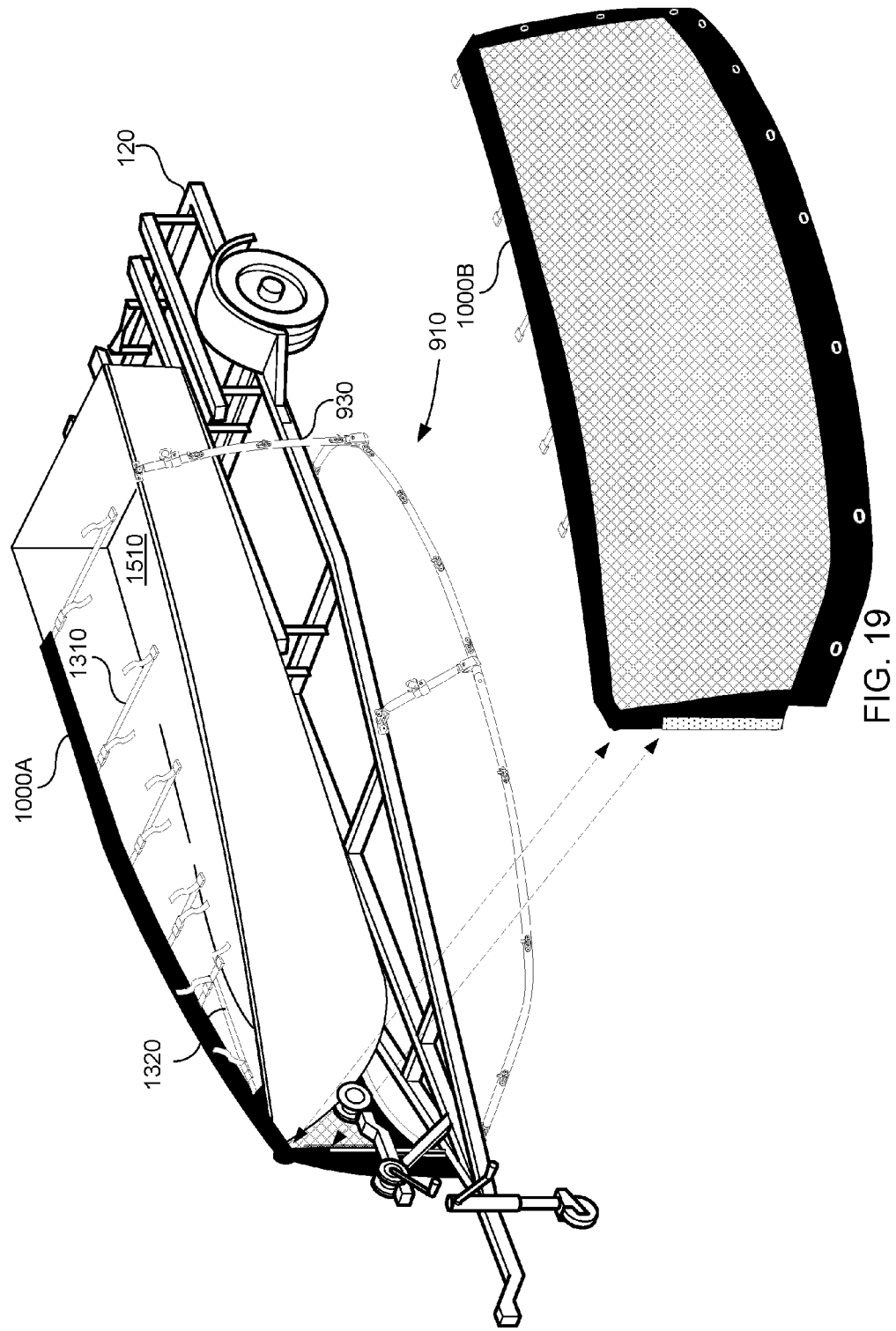
FIG. 19 illustrates the mesh canvas of FIG. 10 attached onto a smaller boat, and the trailer and frame assembly of FIG. 9, in an exploded adjusted configuration.

FIG. 19 illustrates the mesh canvas of FIG. 10 attached onto a smaller boat, and the trailer and frame assembly of FIG. 9, in an exploded adjusted configuration. As shown in FIG. 19, by operating the mechanisms shown in FIGS. 16, 17 and 18, advantageously the mesh canvas 1000 and frame assembly 910 have been adapted to operate with the smaller boat 1510. As shown in the figures, the perpendicular arm 930 is shorter, and all of the adjustable straps 1310 and T-strap 1320 have been shortened, resulting in a snug fit of the mesh canvas 1000 onto the smaller boat 1510.

Figure 20:
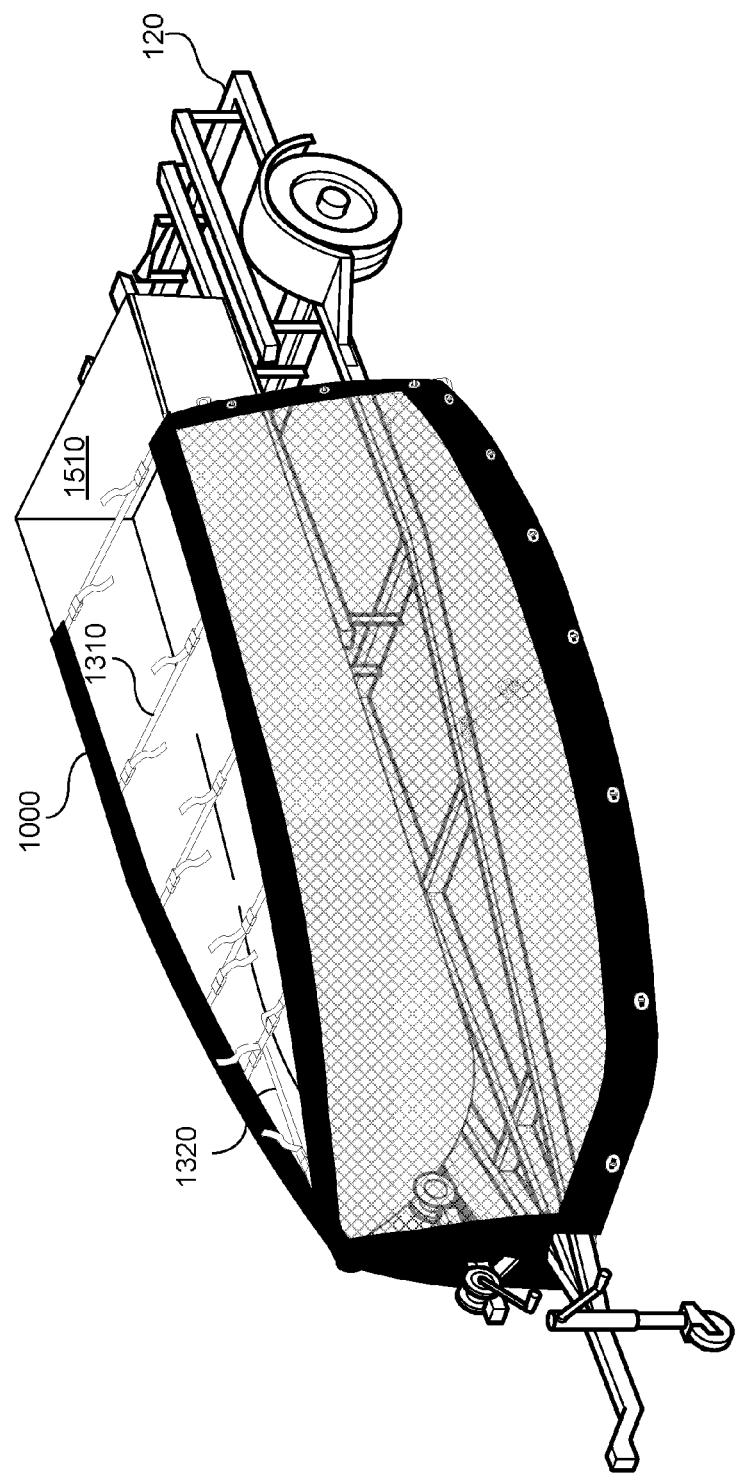
FIG. 20 illustrates the mesh canvas of FIG. 10 attached onto a smaller boat, and the trailer and frame assembly of FIG. 9, in an adjusted configuration.

FIG. 20 illustrates the mesh canvas of FIG. 10 attached onto a smaller boat, and the trailer and frame assembly of FIG. 9, in an adjusted configuration. As shown in FIG. 20, by operating the mechanisms shown in FIGS. 16, 17 and 18, advantageously the mesh canvas 1000 and frame assembly (not visible under the mesh) have been adapted to operate with the smaller boat 1510. As shown in the figures, the perpendicular arm 930 is shorter, and all of the adjustable straps 1310 and T-strap 1320 have been shortened, resulting in a snug fit of the mesh canvas 1000 onto the smaller boat 1510.

Although the above described embodiments can be made at any scale appropriate for specific boats, in alternative preferred embodiments the mesh canvas and corresponding frame assembly are provided as a function of a range of boat and trailer sizes. A measurement from the tip of the bow to the bottom of the trailer base can be used as a reference scale for providing these items in different sizes. For example, different sizes can be provided if the scale measurement is 35 inches or less, between 35 and 40 inches, between 40 and 46 inches, or between 56 and 50 inches. These values are only exemplary. Advantageously, this approach enables only four sizes to adapt to an extremely large number of boat and trailer combinations, enabling addressing the entire market without the need of custom sizing.

Although not expressly shown in the drawings, it is envisaged to provide a mesh canvas with additional portions that are substantially parallel to the road to further protect from debris that may be thrown up and hit the boat. For example, a mesh canvas portion may be provided to extend from one frame to the other under the trailer, or two mesh canvas portions may be provided to extend from the frame to the base of the trailer, along with corresponding turnbuckles and eyelets, or straps as may be required. In alternative embodiments, instead of providing adjustable straps or T-Strap, pre-cut straps or T-Straps are provided to fit a particular boat and trailer combination.

The above-described embodiments of the present invention are intended to be examples only. Those of skill in the art may effect alterations, modifications and variations to the particular embodiments without departing from the scope of the invention, which is defined in the appended claims.

What is claimed is:

1. A debris shield adaptable for use with a boat and a trailer, the boat having a bow and stern, the trailer having a hitch end and a tail end, the trailer including a base and wheels, the base having a determinable width along its length, the trailer base being wider at the tail end relative to the narrower hitch end, the wheels rotationally attached to the base, the trailer being configured to receive the boat for transport whereby the boat sits on the trailer with the bow of the boat oriented towards the hitch end of the trailer and the stern of the boat oriented towards the tail end of the trailer, the boat having portions that sit at a determinable height above the base of the trailer, the bebris shield comprising:
   a frame assembly including:
      a frame having a front portion suitable to be connected to the base of the trailer towards the hitch end of the trailer, a back portion suitable to be connected to the base of the trailer towards the tail end of the trailer, and a substantially straight portion therebetween;
   at least one adjustable arm having one end suitable to be connected to one of a side portion of the boat that sits above the trailer and the base of the trailer, and another end suitable to be connected to the frame, the at least one adjustable arm being adjustable in length to adapt the frame to at least one of the height of the boat and the width of the trailer base; and
   a canvas including a substantially rectangular part, the rectangular part having:
      a trailer side fastenable to the frame;
      a stern side substantially perpendicular to the trailer side, the stern side fastenable to the frame assembly;
      a boat side substantially parallel to the trailer side thereby delimiting a height of the rectangular part; and
      a bow side substantially parallel to the stern side thereby delimiting a length of the rectangular part;
   such that the debris shield is adjustable to at least one of the height of the boat and the width of the trailer.

2. The debris shield according to claim 1, further comprising a second frame assembly and a second substantially rectangular part of the canvas, the second frame assembly and second substantially rectangular part being mirror images of first said frame assembly and first said substantially rectangular part of the canvas.

3. The debris shield according to claim 2, wherein the two rectangular parts of the canvas are at least partially joined together at their respective bow sides.

4. The debris shield according to claim 3, wherein the partial join at the bow sides is at least partially releasable proximate to the trailer side and includes a cut out portion that is releasably joined using a hook and loop type fastener so as to conform the bow end of the canvas to the hitch end of the trailer.

5. The debris shield according to claim 1, wherein at least one end of the frame assembly includes an end piece to connect with a corresponding bracket provided at one of the trailer base, the boat, and the frame.

6. The debris shield according to claim 1, wherein at least one end of the adjustable arm includes an end piece to connect with a frame bracket provided on the frame such that the adjustable arm is free to rotate and be in at least two positions, a stowed position whereat the adjustable arm is substantially parallel to the frame and a deployed position whereat the adjustable arm is substantially perpendicular to the frame.

7. The debris shield according to claim 1, wherein the at least one adjustable arm includes one of a middle adjustable arm and a perpendicular adjustable arm.

8. The debris shield according to claim 1, further comprising at least one of a screw, screw knob and turn screw to attach at least one end of the frame and the adjustable arm to one of the trailer base, boat, and frame.

9. The debris shield according to claim 1, wherein the frame is provided in two parts, a back frame including at least the back portion and a straight end, and a front frame including at least the front portion and a straight end, the back frame and front frame being releasably joined at their respective straight ends to form the substantially straight portion using a joining feature.

10. The debris shield according to claim 9, wherein the joining feature includes a push button spring snap clip provided on a narrow diameter of the straight end of the back frame and a corresponding pair of holes provided on the straight end of the front frame.

11. The debris shield according to claim 1, wherein at least one of the stern side and the trailer side of the canvas includes a turnbuckle eylet to fasten onto a corresponding turnbuckle provided on the frame assembly.

12. The debris shield according to claim 1, further comprising at least one strap wherein the boat side of the canvas includes at least one buckle operable with the strap to further conform the boat side of the canvas to the height of the boat.

13. The debris shield according to claim 12, wherein the at least one strap is adjustable.

14. The debris shield according to claim 13, wherein the at least one strap includes a T-strap, wherein the bow side of the canvas includes at least one buckle operable with the T-strap and the at least one buckle of the side of the canvas to further conform the bow side of the canvas to the height of the boat.

15. The debris shield according to claim 14, wherein the T-strap is adjustable.

16. The debris shield according to claim 1, wherein the frame is bow-shaped, the front portion is a front bent portion, and the back portion is a back bent portion.

17. The debris shield according to claim 1, wherein the canvas is made of mesh.

18. The debris shield according to claim 1, wherein at least one portion of the frame is connected to the base of the trailer referencing the trailer, and wherein at least another portion of the frame is connected to the base of the trailer referencing the boat.

19. The debris shield according to claim 1, wherein the canvas is conformable at least along its boat side to the height of the boat that sits above the trailer.

20. The debris shield according to claim 1, wherein the canvas includes a portion substantially parallel to the road to further protect from debris that may be thrown up under the trailer and hit the boat.

* * * * *